UNITED STATES PATENT OFFICE.

JOHN W. NOLAND, OF RICH HILL, MISSOURI.

AGUE REMEDY.

SPECIFICATION forming part of Letters Patent No. 435,046, dated August 26, 1890.

Application filed April 18, 1890. Serial No. 348,460. (No specimens.)

*To all whom it may concern:*

Be it known that I, JOHN W. NOLAND, a citizen of the United States, residing at Rich Hill, in the county of Bates and State of Missouri, have invented a new and useful Medical Compound, of which the following is a specification.

My invention relates to a medical compound which has peculiar remedial properties for ague, chills, and all malarial troubles. The materials which enter into combination to form this compound are, namely, extract of logwood, bicarbonate of soda, water, sugar, alcohol, quinine, cinchonidia, hydrocyanic acid, and sirup of wild cherry.

The proportions with which the preparation is compounded to form one gallon are as follows: Extract of logwood, four ounces; bicarbonate of soda, five ounces; water, two and one-half pints; sugar, four pounds; alcohol, six ounces; quinine, one ounce; cinchonidia, two ounces; hydrocyanic acid, three drams, and sirup of wild cherry sufficient to make up the gallon.

The above-mentioned ingredients in the proportions stated are mixed together in the manner herein described. The logwood is dissolved in two and one-half pints of boiling water, and while in a heated condition is strained through a suitable cloth into a suitable vessel. This vessel is then placed upon a stove, or is used in connection with any other heating source, and while being reheated the bicarbonate of soda is carefully added, only a little at a time being dropped in the vessel, and a continual stirring is observed in order to keep the contents of the receptacle from foaming over. Now the sugar is added, and the stirring kept up until the fluid is in a boiling state. When it reaches this point, the vessel is removed from the fire, and when cool is poured into a gallon receptacle, or, in case of a greater or less quantity of mixture, in a correspondingly-sized vessel. The quinine and cinchonidia are placed together in a mortar and thoroughly pulverized, in which condition they are added to the mixture in its last stage. After the addition of quinine and cinchonidia the whole is thoroughly agitated. The alcohol and hydrocyanic acid are now added, and the mixture is again agitated, as before mentioned. Lastly, a sufficient quantity of the sirup of wild cherry is introduced to make up the gallon, or, if in case of greater or less quantities, is the last ingredient to be added, and is always added in a quantity sufficient to make up the amount of liquid desired.

The directions for using my compound are as follows: Adults, two tea-spoonfuls every two hours till chills stop. Then half as much three times a day for three days. Then the same amount on the sixth day from the last chill, and in bad cases every seventh day from this till the twenty-first is passed in safety. Children from five to ten years old, one tea-spoonful; one to four years old, half tea-spoonful. Repeat dose as for adult. For other malarial troubles than chills give same dose as above and repeat every two to three hours till well. Increase the dose if the amount commenced on does not stop chills. Regulate dose to suit other ages.

I am aware that quinine and wild cherry have been used in mixtures prepared especially for malarial troubles; but I am not aware that they have been used in the proportions and in conjunction with the other ingredients, as specified.

Having thus described my compound, its preparation and proportions, what I claim as new, and desire to secure by Letters Patent, is—

The herein-described composition of matter to be used as a remedy for malarial troubles, consisting of extract of logwood, bicarbonate of soda, water, sugar, alcohol, quinine, cinchonidia, hydrocyanic acid, and sirup of wild cherry compounded, substantially in the proportions specified.

In testimony that I claim the foregoing as my own I have hereto affixed my signature in presence of two witnesses.

JOHN W. NOLAND.

Witnesses:
L. W. MOORE,
W. C. STONEBROKER.